United States Patent [19]

Maroist

[11] Patent Number: 5,319,155

[45] Date of Patent: Jun. 7, 1994

[54] HEAT AND FIREPROOF DUCT FOR ELECTRICAL AND COMMUNICATION WIRES AND THE LIKE

[75] Inventor: Jules Maroist, Beloeil, Canada

[73] Assignee: Ramfiq Fireproof Systems Inc., St-Laurent

[21] Appl. No.: 939,147

[22] Filed: Sep. 2, 1992

[51] Int. Cl.⁵ .............................................. H01B 7/34
[52] U.S. Cl. ................................. 174/28; 174/11 R; 174/15.1; 174/21 R; 174/21 C
[58] Field of Search ............... 174/28, 11 R, 14 R, 174/21 R, 21 JS, 21 C, 95, 99 R, 15.1

[56] References Cited

U.S. PATENT DOCUMENTS

| | | | |
|---|---|---|---|
| 3,654,378 | 4/1972 | Rehder | 174/16.2 |
| 3,779,179 | 12/1973 | Marois | 109/33 |
| 3,818,116 | 6/1974 | Kuljian | 174/28 |
| 3,977,704 | 8/1976 | Meyer | 174/210 |
| 5,109,779 | 5/1992 | Maroist | 109/33 |

Primary Examiner—Morris H. Nimmo

[57] ABSTRACT

The duct comprises an inner tube in which the wires are disposed, and this inner duct is placed inside an outer tube so as to provide a continuous inner space between the tubes, which completely surrounds the inner tube. A water inlet is in communication with the inner space and water is allowed to penetrate into the inner space upon the opening of a valve. The valve is operated by a fire detector. Upon activation of the valve in case of fire, water circulates through the inner space and is rejected into a drain. This system constitutes a fire and heat barrier for the wires of a building, for example.

8 Claims, 1 Drawing Sheet

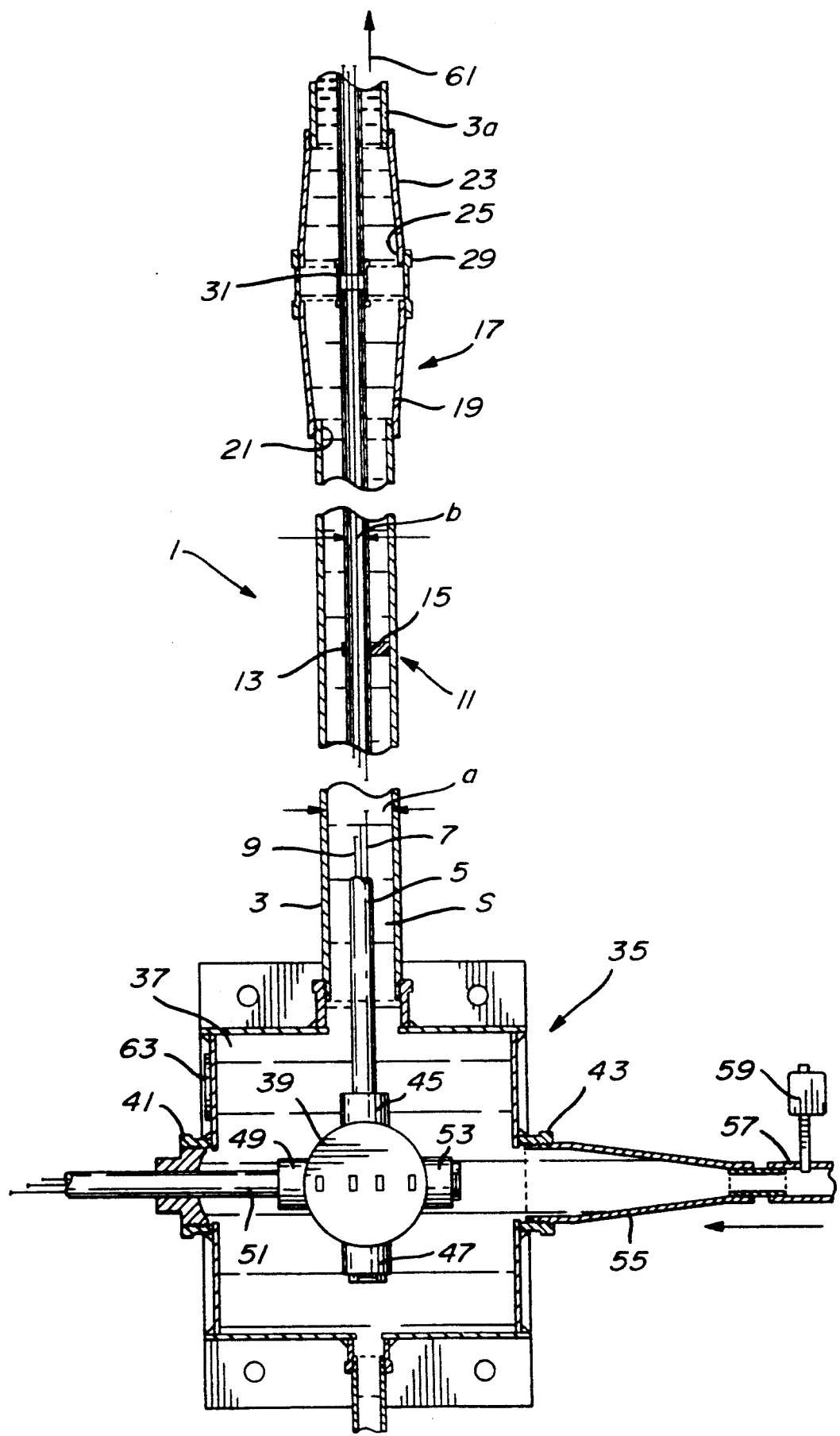

HEAT AND FIREPROOF DUCT FOR ELECTRICAL AND COMMUNICATION WIRES AND THE LIKE

BACKGROUND OF INVENTION (a) Field of the Invention

The present invention relates to a heat- and fireproof duct, and more particularly, to a duct to contain electrical and communication wires and the like, wherein damage or partial or complete destruction of the latter are prevented in case a fire erupts or there is excessive heat in their vicinity. Whenever the word fire appears throughout the description and claims, this should ipso facto include heat and fire, i.e. fireproof should mean heat- and fireproof.

(b) Description of Prior Art

It is well known that when there is a fire or excessive heat in a building, a lot of destruction takes place and sometimes there is only some damage done. It is also of common knowledge that if the electrical and communication wires are destroyed or damaged, this may have severe consequences due to the impossibility of establishing any kind of communication with persons in the building and because electrical appliances which are sometimes essential cease to operate.

In U.S. Pat. Nos. 3,779,179 and 5,109,779 as well as in Canadian Patent No. 987,542, there are disclosed fire insulated partitions which are made of a double wall and wherein water circulation is initiated within the inner space defined by the double wall as soon as a fire starts in the vicinity of the double partition thereby providing fire insulation in a space surrounded by fire insulated partitions. However, although this system has a lot of merit, it may not be adequate to protect the electrical and communication wiring or the like. In many cases, it may not be practical or possible to provide a building with the above type of double partition, so that additional protection should be envisaged for the wiring system.

SUMMARY OF INVENTION

It is an object of the present invention to provide a system of wiring including electrical and communication wires or the like which will not be destroyed or damaged in case of a fire or excessive heat.

The above and other objects according to the invention are made possible by providing a heat- and fireproof duct for electrical and communication wires and the like which are enclosed within the duct. The duct comprises an outer elongated hollow member of larger cross-section, an inner elongated hollow member of smaller cross-section and disposed within the outer elongated hollow member, the inner elongated hollow member to contain the electrical and communication wires and the like, means enabling the outer and inner elongated hollow member to provide a continuous inner space therebetween, the space to substantially completely surround the inner member, at least one water inlet and valve means to connect the water inlet with the inner space, a drain allowing water to continuously escape from the inner space after the water inlet has been connected thereto through opening of the valve means, thereby establishing a continuous circulation of water through the inner space all around the inner hollow member to constitute a heat and fire barrier for the electrical and communication barriers or the like; and a fire and heat detector operable to cause opening of the valve means in case a fire erupts or excessive heat takes place in the vicinity of the duct and closing thereof when temperature drops. The inner and outer hollow members are preferably tubular shaped.

In accordance with a preferred embodiment of the invention, the duct comprises spacer means to hold the inner hollow member at a predetermined distance from the outer hollow member so as to provide the continuous inner space.

Preferably, the spacer means comprise a nylon member or the like material having a bracket portion to hold the inner hollow member and a wing portion to keep the inner hollow member at a predetermined distance from the outer hollow member.

In accordance with yet another preferred embodiment of the invention, the duct consists of a plurality of duct sections, and means are provided for connecting these sections together. Preferably, the connecting means comprise a first sleeve engaging over an end of one duct section. A second sleeve engages over a mating end of an adjacent duct section, a coupling engages an adjacent inner hollow member interiorly of the first and second sleeves, a joining member connects the first and second sleeves end to end, and a spacer is placed between the inner hollow members and the sleeves, opposite the joining member.

According to another embodiment of the invention, boxes are disposed along the duct. These boxes are arranged to allow continuous water circulation all along the duct, each box having means enabling to tap one water inlet and means to connect the electrical and communication wires and the like outside the box and the duct.

According to another preferred embodiment of the invention, the valve means is a solenoid valve which is electrically connected with the fire and heat detector. In this arrangement, it is imperative that the fire and heat detector be electrically connected with the solenoid valve in such a manner that when there is no heat or fire in the vicinity of the duct, the detector will cause the valve to be kept closed. When fire erupts or in the presence of excessive heat, and even when there is a power failure (due to fire or heat), the fire and heat detector will cease to be electrically connected with the valve and thereby cause it to open while initiating water circulation through the inner space.

BRIEF DESCRIPTION OF DRAWINGS

The invention will now be illustrated by means of the annexed drawings which are given without any invention to restrict the invention thereto and in which:

The single FIGURE is a longitudinal cross-section along a heat- and fireproof duct according to the invention.

DESCRIPTION OF PREFERRED EMBODIMENT

The heat- and fireproof duct 1 according to the invention, as illustrated in the drawings, essentially consists of an outer elongated hollow tube 3 having a diameter a, and an inner elongated hollow tube 5 with a diameter b substantially smaller than diameter a of hollow tube 3. This enables to dispose hollow tube 5 within hollow tube 3 as particularly shown in the drawings. The hollow tube 5 contains electrical and communication wires 7 and 9 disposed in known manner therein again as shown in the drawings.

With the diameter a of hollow tube 3 substantially larger than the diameter b of hollow tube 5 and the latter tube disposed inside tube 3, this provides a continuous inner space S between the two tubes, which space completely surrounds the inner tube 5. To mount the inner tube inside the outer tube while providing the continuous inner space S mentioned above, there is provided a spacer 11 of nylon or the like material to keep the distance constant between the inner and outer tubes 5 and 3. As shown, spacer 11 consists of a bracket portion 13 which holds the inner tube 5 and a wing portion 15 having its outer end abutting against the inner wall of the outer tube 3, thereby ensuring that the inner space S is constant and continuous.

Normally, the duct 1 which contains electrical and communication wires 7 and 9 is made up of a plurality of sections which are connected together by means of connectors 17 of which a specific design is shown in the drawings. Any other design would, of course, be possible as is well known to those skilled in the art.

Each connector 17 consists of a sleeve 19 which engages over an end 21 of the outer tube 3 of one duct section, and a second sleeve 23 which engages over a mating end 25 of an adjacent duct section 3a. A joining member 29 which could be of any design selected by one skilled in the art connects together sleeves 19 and 23 as shown in the drawings. Inside the connector 17, the inner tubes 5 are mounted end to end as shown and a coupling 31 joins them together.

The duct system according to the invention, as illustrated in the drawings, includes a plurality of connecting boxes 35, only one being illustrated in the drawings, for the purpose of convenience. As shown, the box 35 defines a chamber 37 to receive a tube connector 39 and to allow for the continuous water circulation all along the duct 1 from an inner space S to the next one if it is provided. As illustrated, the box has nipples 41, 43 on both sides thereof. This arrangement permits to connect an inner tube 5 to tube connector 39 for example at 45, 47. The outlet 49 enables to branch the electrical and communication wiring from the main line inside inner tube 5 via side tube 51 and to connect same at any place desired (not shown in the drawings). Other tube outlets may be provided such as at 53, if necessary. Finally, through nipple 43, a water duct 55 is connected to a water inlet 57 which itself is connected to a source of water not shown, to permit the entry of water into chamber 37 and from there to the inner space S. A solenoid valve 59 which can be electrically or electronically activated enables to produce upon being opened, a continuous circulation of water throughout chamber 37 and inner space S. When circulating, water is continuously rejected in drain 61. It will be realized that this circulation of water constitutes a barrier for the electrical and communication wires 7 and 9 in case of fire. To provide this continuous circulation of water, it is merely necessary to mount fire and heat detectors 63 at proper locations along the duct 1 (for example at the entrance or the exit of the duct) and to operatively connect them in known manner to the solenoid valve. The solenoid valve is of the type which remains closed when it is electrically connected to the fire and heat detector 63. In case of fire or excess heat, the fire and heat detector will cease to be electrically connected with valve 69 thereby causing the valve to open. Of course, other type of valves and connections with the fire and heat detector are possible as is well known to those skilled in the art. For example, fusible link valves may be used.

Although the invention has been described with respect to a specific embodiment, it is not limited thereto and modifications are possible as is well known to those skilled in the art within the scope of the appended claims.

I claim:

1. Heat- and fireproof duct for electrical and communication wires and the like which are enclosed within said duct, said duct comprising:
   an outer elongated hollow member of larger cross-section,
   an inner elongated hollow member of smaller cross-section and disposed within said outer elongated hollow member, said inner elongated hollow member to contain said electrical and communication wires and the like,
   spacer means enabling said outer and inner elongated hollow member to provide a continuous inner space therebetween, said space to substantially completely surround said inner member,
   at least one water inlet to be connected to a source of water for introducing water into said continuous inner space between said inner and outer hollow members and valve means on said water inlet,
   a drain allowing water to continuously escape from said inner space after said water inlet has been connected thereto through opening of said valve means, thereby establishing a continuous circulation of water through said inner space all around said inner hollow member to constitute a fire barrier for said electrical and communication barriers or the like; and
   a fire and heat detector operable to cause opening of said valve means in case a fire erupts in the vicinity of said duct and closing thereof when temperature drops.

2. Heat- and fireproof duct according to claim 1, wherein said inner and outer hollow members are tubular shaped.

3. Heat- and fireproof duct according to claim 1, wherein said spacer means holds said inner hollow member at a predetermined distance from said outer hollow member so as to provide said continuous inner space.

4. Heat- and fireproof duct according to claim 3, wherein said spacer means comprises a nylon member or the like material having a bracket portion to hold said inner hollow member and a wing portion to keep the inner hollow member at a predetermined distance from said outer hollow member.

5. Heat- and fireproof duct according to claim 1, wherein said duct consists of a plurality of duct sections, and means are provided for connecting said sections together.

6. Heat- and fireproof duct according to claim 5, wherein said connecting means comprises a first sleeve engaging over an end of one duct section, a second sleeve engaging over a mating end of an adjacent duct section, a coupling engaging adjacent inner hollow members interiorly of said first and second sleeves, a joining member to connect said first and second sleeves end to end.

7. Heat- and fireproof duct according to claim 5, which comprises connecting boxes disposed along said duct, said connecting boxes arranged to allow continuous water circulation all along said duct, each box having nipple means and a water duct enabling to tap one said water inlet and inner tube connector means to connect said electrical and communication wires and the like outside said box and said duct.

8. Heat- and fireproof duct according to claim 1, wherein said valve means is a solenoid valve which is electrically connected with said fire and heat detector, said solenoid valve normally remaining closed by electrical contact with said fire and heat detector and in case of fire or excessive heat, the fire and heat detector will cease to be electrically connected with said valve thereby causing opening of said solenoid valve and initiating water circulation through said inner space.

* * * * *